United States Patent [19]
Haras

[11] Patent Number: 4,856,935
[45] Date of Patent: Aug. 15, 1989

[54] BEACHFRONT WAVE ENERGY DISSIPATION STRUCTURE

[76] Inventor: William S. Haras, 28 Meyer Drive, Guelph, Ontario, Canada, N1E 4H2

[21] Appl. No.: 81,059

[22] Filed: Aug. 3, 1987

[51] Int. Cl.$^4$ .......................... E02B 3/04; E02B 3/06
[52] U.S. Cl. ........................................ 405/35; 405/30; 405/21
[58] Field of Search .................................. 405/25-34, 405/15, 16, 35

[56] References Cited

U.S. PATENT DOCUMENTS

| | | | |
|---|---|---|---|
| 20,105 | 4/1858 | Tracy | 405/35 |
| 1,199,878 | 10/1916 | Doren | 405/33 |
| 1,353,001 | 9/1920 | Uriarte | 405/35 |
| 1,500,119 | 7/1924 | Evers | 405/33 X |
| 2,384,207 | 9/1945 | Stoye | 405/33 |
| 2,827,769 | 3/1958 | Hunter | 405/33 |
| 3,724,221 | 4/1973 | Cool | 405/35 |
| 4,367,978 | 1/1983 | Schaaf et al. | 405/35 X |

FOREIGN PATENT DOCUMENTS

| | | | |
|---|---|---|---|
| 0673689 | 9/1979 | U.S.S.R. | 405/35 |
| 1160523 | 8/1969 | United Kingdom | 405/35 |

*Primary Examiner*—Dennis L. Taylor
*Attorney, Agent, or Firm*—R. Craig Armstrong

[57] ABSTRACT

A beachfront wave energy dissipation structure is disclosed. The structure has a plurality of vertically stacked parallel plates having two lateral edges, a shore-facing edge, and a water-facing edge, and a plurality of columns disposed between and connecting the plates. The columns are laterally and longitudinally distributed so as to impede free passage of waves between the plates. The shore-facing end of the bottom-most one of the plates preferably is supported at an angle in the range of 10 degrees to 30 degrees from the horizontal, so that the structure can be positioned with the plates angling upwardly away from the water. The plates reduce in longitudinal dimension from the bottom to the top of the stack, and are arranged in step fashion rising in the direction away from the water-facing edge.

6 Claims, 3 Drawing Sheets

A-A

BEACHFRONT WAVE ENERGY DISSIPATION STRUCTURE

BACKGROUND OF THE INVENTION

This invention relates to a beachfront wave energy dissipation structure.

Shoreline erosion caused by wave action is a major problem, especially when unusually high water levels accentuate the problem.

In the prior art, many different structures have been used to attempt to minimize shoreline erosion, with varying degrees of success. Many structures have been quite ineffective, while others have been effective but very expensive.

Rigid structures which the waves hit squarely usually cannot cope with the pounding of waves on a long-term basis. It is therefore desireable to create a structure which gradually absorbs the energy of an incoming wave throughout the structure rather than repelling it as with a vertical impermeable surface, i.e. a wall.

SUMMARY OF THE INVENTION

It is an object of the present invention to provide an easily installed beachfront wave energy dissipation structure which will minimize erosion at a feasible cost.

Thus in accordance with the present invention there is provided a structure which has a plurality of spaced-apart vertically stacked parallel plates each having two lateral edges, a shore-facing edge, and a water-facing edge, and a plurality of columns disposed between and connecting the plates. The columns are laterally and longitudinally distributed so as to impede free passage of waves between the plates.

In accordance with the preferred embodiment, the shore-facing end of the bottom-most one of the plates is supported at an angle in the range of 10 degrees to 30 degrees from the horizontal, so that the structure can be positioned with the plates angling upwardly away from the water. The plates preferably reduce in longitudinal dimension from the bottom to the top of the stack, and are arranged in step fashion rising in the direction away from the water-facing edge.

Further features of the invention will be described or will become apparent in the course of the following detailed description.

DETAILED DESCRIPTION OF THE PREFERRED EMBODIMENT

In order that the invention may be more clearly understood, the preferred embodiment thereof will now be described in detail by way of example, with reference to the accompanying drawings, in which.

Figure 1:
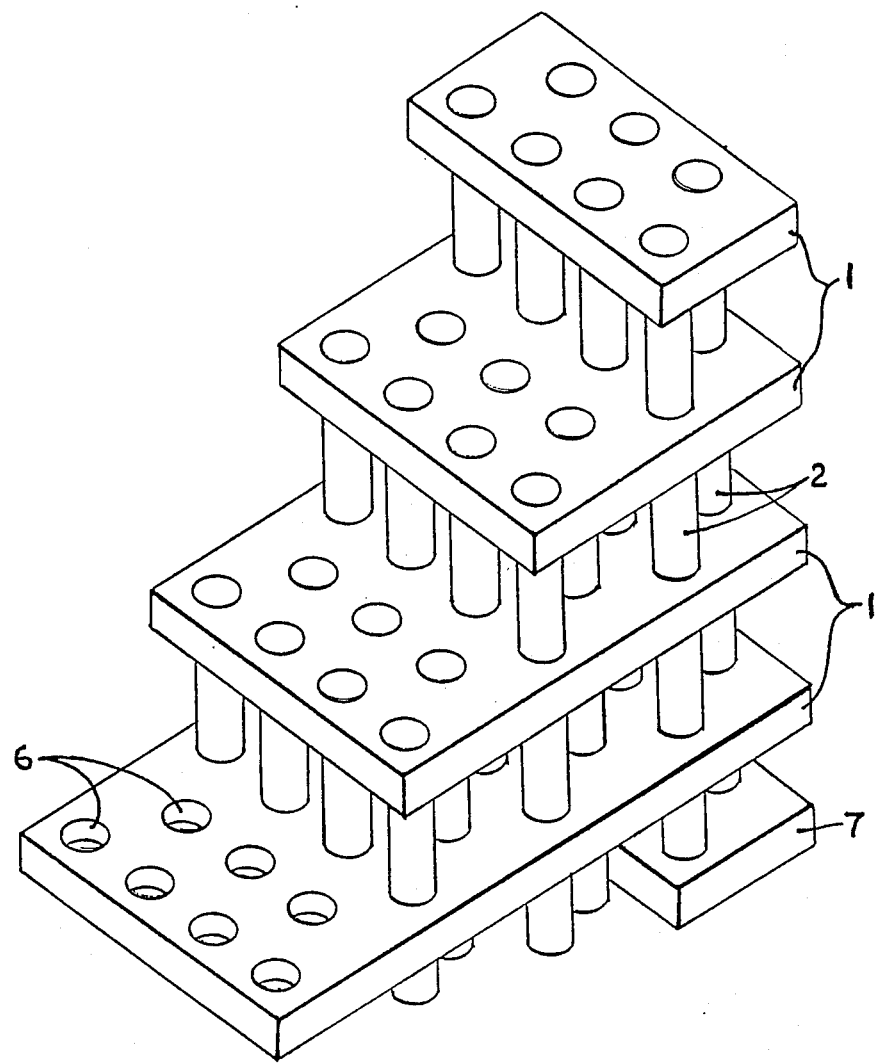
FIG. 1 is a perspective view of the preferred embodiment.
Figure 2:
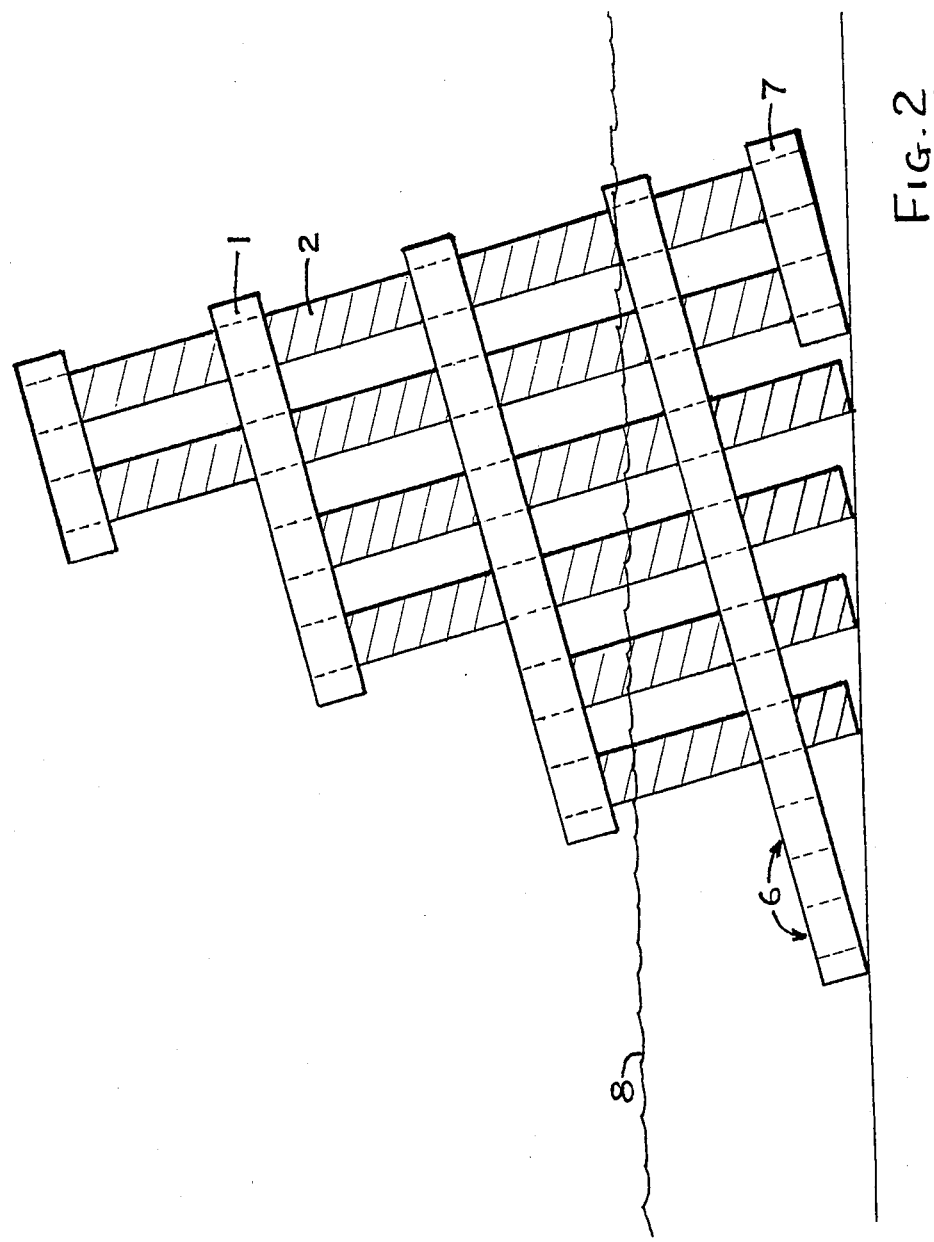
FIG. 2 is a side view of the preferred embodiment.

Referring now to the drawings, the wave energy dissipation structure comprises a plurality of vertically stacked parallel plates 1 with a plurality of columns 2 disposed therebetween. The columns 2 are laterally and longitudinally distributed so as to impede free passage of the waves between the plates 1. The plates 1 reduce in longitudinal dimension from bottom to top of the stack, forming a step-like structure, as seen in FIGS. 1 and 2.

A support plate 7 is positioned to support the shore side of the structure, so that when the structure is placed on or near the strandline, it angles downwardly towards the incoming waves, forcing the waves to climb an incline. The angle of the structure is approximately 15 degrees, and the angle of the structure as installed could also be about 15 degrees or could vary in accordance with the slope of the existing shore. Preferably, the combined structure and beach angle, i.e. the angle relative to the water surface, should not be greater than about 30 degrees, so as so avoid having too much of the impact of the waves being taken by the plates 1 as opposed to the columns 2, and so that the columns 2 are not too inclined. Therefore, the angle of the structure itself should be, at the greatest, about 30 degrees. If necessary, or if desireable, the site may be prepared in advance, to provide a relatively level installation location.

Figure 3:
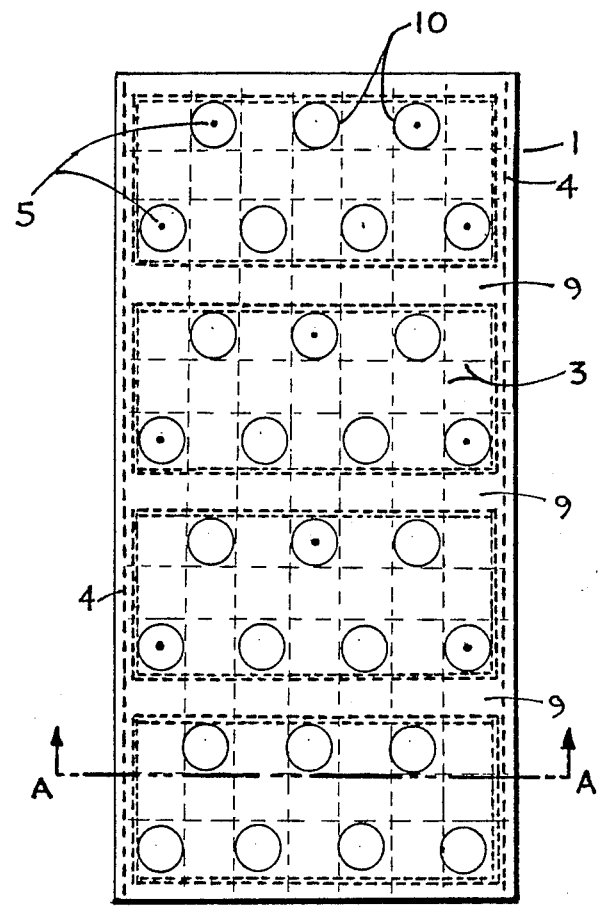
FIG. 3 is a top view of a plate of the preferred embodiment.

The plates 1 are of dry poured concrete which is reinforced with a wire mesh 3, as can be seen in FIG. 3, and with two vinyl-coated steel reinforcing rods 4 along the sides of each plate 1. The plates 1 are poured with six-inch diameter holes 10 at one-foot center-to-center spacing within lateral rows, staggered by six inches as between adjacent rows, the rows being one foot apart. The wire mesh 3 has six-inch squares so that the holes can be positioned within the squares, so that the wire mesh 3 reinforcement is continuous.

Figure 4:
FIG. 4 is sectional side view of a plate of the preferred embodiment takes at section A—A of FIG. 3. Section lines are eliminated for clarity.

Each plate 1 is four feet in lateral discussion, with the longitudinal dimension varying from eight feet in the case of the bottom-most plate, to two feet in the case of the top-most plate. The support plate 7 is four feet wide, with a longitudinal dimension of two feet. As shown in FIGS. 3 and 4, lateral ribs 9 are spaced every two feet. The plates are six inches thick at the edges and at the ribs 9. In other areas, they are three inches thick. The plates are at a two-foot spacing, i.e. with 1½ foot spaces between them (as measured at a rib 9 or at an edge). This structure provides the necessary weight and strength to resist the action of the waves.

With the dimensions described above, the columns 2 account for approximately 17 percent of the volume between the plates 1. This percentage could be increased or reduced as desired, with obvious effects on performance of the structure, but it is preferable that at least about 15 percent of the volume be occupied by the columns. A number of the columns are support columns, and have reinforcing rods 5.

It is also preferable that the columns 2 be arranged such that there is virtually no straight longitudinal path through between the plates 1.

The reinforcing rods 4,5 are of vinyl coated steel rods. The vinyl coating assists in preventing rusting of the reinforcing rods 4,5, thereby assisting in maintaining the integrity of the dissipation structure.

Each plate 1 is formed with the holes 10. In the case of the bottom-most plate, two rows of holes 6 nearest the water-facing edge of the structure are left open, to facilitate better anchoring of the structure with in situ material. Except with respect to these first two rows 6 of holes 10, columns 2 extend down to the ground from the bottom-most plate, so as to provide greater support for the structure and particularly for the bottom-most plate, and so as to better anchor the structure in its location.

The structure is produced by first positioning form tubes with six inch inside diameter above the holes in the support plate, positioning the bottom-most plate 1 above the support plate, supported by the form tubes, positioning form tubes under the remaining holes in the bottom-most plate, except with respect to the first two rows 6, and then pouring expandable concrete into the tubes through the holes in the bottom-most plate to form the columns 2. As the concrete cures in the tubes, it expands and locks the column 2 into the holes in the plate. Then, form tubes are positioned above the bottom-most plate, the next plate is positioned, and more concrete is poured. The process is repeated until the structure is completed.

If desired, a wedge shape (not shown), whether integral or separate, can be positioned under the support plate 7. Similarly, the bottom ends of the columns which extend below the bottom-most plate can be angled if a horizontal interface is desired.

The structure is normally positioned near the strand-line, preferably is approximately two feet of water, such a waterline 8 being shown in FIG. 2. The angle of the structure forces the water to move up the inclined plates 1. As it does so and strikes the columns 2, its energy or a substantial portion of it is dissipated. Sediment carried by water which passes through the structure is deposited in the calm region behind and under the structure. This deposition of sediment partially buries and assists in anchoring the structure, and as well has the highly desireable and beneficial effect of creating or recreating a beach behind the structure. A beach should also form in front of the structure to some extent, i.e. on the water-facing side of the structure. The beach forms primarily because by the time the waves have passed through the structure, there is little remaining energy to carry the sand or other sediment away.

In some cases, the structure may be positioned quite close to an existing bluff where erosion has taken place, while in other cases, it may be positioned further out so as to form a beach between the structure and the bluff. In other cases, it may be desireable to take steps such as positioning the structure away from the bluff, and then deposit gravel or sand or other suitable fill between the structure and the bluff.

One advantage of the structure is that it has no side walls and a number of the structures can therefore be easily placed side by side along a shoreline which is being eroded by wave action, with continuity between the structures.

It will be appreciated that the above description relates to the preferred embodiment by way of example only. Many variations on the invention will be obvious to those knowledgeable in the field, and such obvious variations are within the scope of the invention, whether or not expressly described. Many obvious variations could be made to meet the requirements of the particular site.

For example, it should be obvious that the above-described dimensions could be varied widely, either to a larger scale or a smaller scale, whether interally, longitudinally, and/or heightwise. The proportions could also change. Similarly, the size and distribution of the columns could be varied considerably.

Also, the structure could vary in the number of plates. For example, instead of having 8, 6, 4 and 2 foot plates as described above (supported an angle by virtue of another 2 foot plate), the structure could have any desireable combination to suit the shoreline, usual wave conditions, and the extent of the erosion problem. Just a few possible combinations would be, for example, 8-6-4-4-2, or 6-4-2, or 8-6-6-4-2, or 8-8-6-6-4-2, etc.

It should also be appreciated that the structure could be manufactured and installed with no angle at all, in which case it would be the columns 2 which absorbed virtually all of the wave energy. However, although this would have some beneficial effect and is therefore considered to be within the scope of the invention, it is much preferred that the structure be angled, not only for improved energy absorption and dissipation, but also for beach formation.

What is claimed as the invention is:

1. A beachfront wave energy dissipation structure, comprising a plurality of spaced-apart vertically stacked parallel plates each having two lateral edges, a shore-facing edge, and a water-facing edge, and a plurality of columns disposed between and connecting said plates, said columns being laterally and longitudinally distributed over a substantial portion of the area between said plates so as to impede free passage of waves between said plates.

2. A structure as recited in claim 1, further comprising means for supporting the shore-facing end of the bottom-most one of said plates at an angle in the range of 10 degrees to 30 degees from the horizontal, whereby said structure may be arranged such that said plates angle upwardly away from the water.

3. A structure as recited in claim 2, in which said plates reduce in longitudinal dimension from the bottom to the top of the stack, and are arranged in step fashion rising in the direction away from the water-facing edge.

4. A structure as recited in claim 1, in which said columns occupy at least about 15 percent of the volume between respective plates.

5. A structure as recited in claim 2, in which said columns occupy at least about 15 percent of the volume between respective plates.

6. A structure as recited in claim 3, in which said columns occupy at least about 15 percent of the volume between respective plates.

* * * * *